United States Patent [19]

Maruyama et al.

[11] Patent Number: 4,497,223

[45] Date of Patent: Feb. 5, 1985

[54] ENGINE SPEED CONTROL SYSTEM FOR A HYDRO-MECHANICAL TRANSMISSION

[75] Inventors: Ryoichi Maruyama; Takayoshi Nishijima; Hideaki Aida, all of Yokohama; Hideyuke Konishi, Kamakura; Keiji Hatayama, Yokohama, all of Japan

[73] Assignee: Kabushiki Kaisha Komatsu Seisakusho, Tokyo, Japan

[21] Appl. No.: 465,664

[22] Filed: Feb. 10, 1983

[30] Foreign Application Priority Data

Feb. 17, 1982 [JP] Japan ................... 57-22819

[51] Int. Cl.³ .............................. B60K 41/18
[52] U.S. Cl. ..................... 74/866; 364/424.1
[58] Field of Search .......... 74/866, 687, 714; 364/424.1

[56] References Cited

U.S. PATENT DOCUMENTS

| | | | |
|---|---|---|---|
| 3,815,698 | 6/1974 | Reed | 74/720.5 X |
| 3,890,360 | 6/1975 | Pruvot et al. | 74/866 X |
| 4,107,776 | 8/1978 | Beale | 74/866 X |
| 4,131,035 | 12/1978 | Mizuno et al. | 74/866 |
| 4,220,059 | 9/1980 | Mizuno et al. | 74/866 X |
| 4,229,998 | 10/1980 | Mizuno et al. | 74/866 |
| 4,253,347 | 3/1981 | Mizuno et al. | 74/866 X |
| 4,261,229 | 4/1981 | Mizuno et al. | 74/866 |
| 4,309,917 | 1/1982 | Leet | 74/687 X |
| 4,319,501 | 3/1982 | Sugimoto | 74/866 |
| 4,386,688 | 6/1983 | Sato et al. | 74/866 X |

Primary Examiner—George H. Krizmanich
Assistant Examiner—Dirk Wright
Attorney, Agent, or Firm—Armstrong, Nikaido, Marmelstein & Kubovcik

[57] ABSTRACT

An engine speed control system for a hydro-mechanical transmission of a vehicle including a mechanical transmission having a plurality of speed range change-over clutches and pairs of hydraulic pumps and motors, each motor being operatively connected to the mechanical transmission. The control system includes a throttle position detector for detecting throttling position of an engine and generating a throttle position signal. This signal is fed into an engine speed setter where target engine speeds corresponding to the throttle positions are stored. The engine speed setter then sends out a target engine speed signal. An engine speed detector is provided for detecting an actual engine speed and sending out an actual engine speed signal. This actual engine speed signal is compared with the target engine speed signal in a comparator and an engine speed difference signal is generated from the comparator. A pair of adders are provided each for feeding the engine speed difference signal and sending out an output signal to the respective actuators of the hydraulic pumps. The output signal of the adder is such a signal which will gradually approximate the engine speed difference signal to zero.

3 Claims, 2 Drawing Figures

ENGINE SPEED CONTROL SYSTEM FOR A HYDRO-MECHANICAL TRANSMISSION

BACKGROUND OF THE INVENTION

This invention relates to an engine speed control system for a hydro-mechanical drive and steering transmission of a vehicle.

A hydro-mechanical transmission is disclosed in U.S. Pat. No. 3,815,698 issued to Reed wherein power applied to the input of the transmission is utilized for hydraulic drive and steer in forward and reverse of a first range, and combined hydraulic drive and mechanical drive are utilized in a second higher range wherein steer remains a function of the hydraulic portion of the transmission. The transmission also includes a hydro-mechanical third range. Hydrostatic transmissions are characterized by a very high gain which provides a very rapid response to small control inputs, thereby requiring an accurate control and preferably a slow acting control to avoid abrupt changes of ratio. When a hydrostatic transmission has its output coupled to a multi-range gear set, thus providing a hydro-mechanical transmission, control of the hydrostatic unit ratio becomes important in avoiding undesirable shocks to the power train during range shifting of the gear set.

SUMMARY OF THE INVENTION

It is therefore an object of the present invention to provide an engine speed control system for a hydro-mechanical transmission of a vehicle wherein engine speed is automatically controlled to become a target engine speed set by a throttle position of the engine.

Another object of the present invention is to provide an engine speed control system for a hydro-mechanical transmission of a vehicle which is simple in construction yet can provide a reliable engine speed control.

In accordance with an aspect of the present invention, there is provided an engine speed control system for a hydro-mechanical transmission of a vehicle including an engine, mechanical transmission means conducted to the engine and having a plurality of speed range change-over clutches, a pair of hydraulic pumps driven by the engine, a pair of hydraulic motors each driven by the respective hydraulic pumps and operatively connected to the mechanical transmission and a change lever for changing forward and reverse running of the vehicle, said control system comprising: throttle position detector means for detecting throttling position of the engine and generating a first signal therefrom; engine speed setter means responsive to the first signal and generating a second signal indicating a target engine speed; engine speed detector means for detecting actual engine speed and generating a third signal; comparator means for comparing the second signal with the third signal and generating a fourth signal indicating speed difference between the target and actual engine speeds; change lever position detector means for detecting change lever positions among neutral, forward and reverse positions and generating a fifth signal; means for selectively detecting one of the speed range change-over clutches engaged and generating a sixth signal; arithmetic unit means for processing the fourth, fifth and sixth signals and generating a seventh signal; a pair of actuators for controlling displacement volume of the associated hydraulic pumps; and a pair of adder means each connected with said arithmetic unit means and said respective actuators, each of said adder means being adapted to feed said seventh signal and send out an eighth or ninth signal to said respective actuators, said eighth and ninth signals being such a signal which will gradually approximate said fourth signal to zero.

The above and other objects, features and advantages of the present invention will be readily apparent from the following description taken in conjunction with the accompanying drawings.

DESCRIPTION OF THE PREFERRED EMBODIMENT

The present invention will now be described by way of example only with reference to the accompanying drawings.

Figure 1:
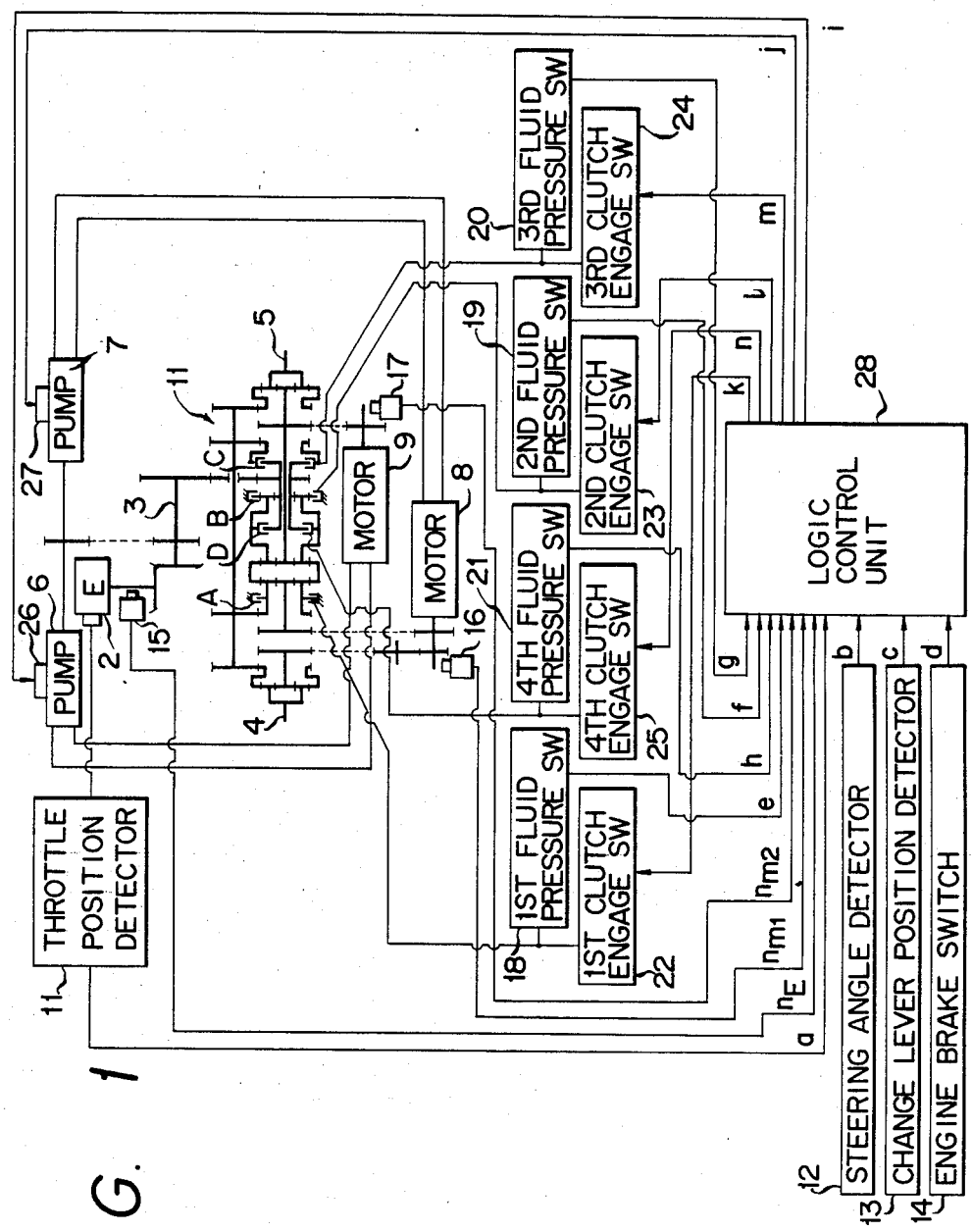
FIG. 1 is a block diagram showing an overall control system of a hydro-mechanical transmission of a vehicle employing an engine speed control system according to the present invention.

FIG. 1 is a block diagram showing an overall control system of a hydro-mechanical transmission employing an engine speed control system according to the present invention.

In the drawings, reference numeral 1 denotes a mechanical transmission having an input shaft 3 connected to an engine 1, and two (left and right) output shafts 4 and 5; 6 and 7 two (left and right) hydraulic pumps driven by the engine 2; and 8 and 9 hydraulic motors driven by the pressurized fluid discharged from the hydraulic motors 6 and 7, respectively. Both the output shafts of the hydraulic motors 8 and 9 are connected to the mechanical transmission 1. The control of the hydraulic motors 8 and 9 enables the transmission 1 to effect stepless speed controls. The mechanical transmission 1 has a first speed range clutch A, a second speed range clutch B, a third speed range clutch C and a fourth speed range clutch D. The arrangement is made such that selective actuation of the respective clutches A, B, C and D enables the number of rotations of the output shafts 4, 5 to be changed into any of the first to fourth speeds.

Reference numeral 11 denotes a throttle position detector means adapted to detect the position of the throttle which controls the number of revolutions of the engine 2 and send out a signal "a"; 12 a steering angle detector adapted to detect the angle of rotation of a steering and generate a signal b; 13 a change lever position detector adapted to detect four positions of the change lever; that is, forward run, reverse run, neutral and spin turn positions of the change lever and take out a signal C corresponding thereto; 14 an engine brake switch adapted to take out a signal d for applying an engine brake, and 15 an engine speed detector adapted to take out an engine speed signal $n_E$ corresponding to the actual engine speed. Reference numerals 16 and 17 denote motor speed detectors adapted to take out speed signals $n_{m1}$ and $n_{m2}$ of the hydraulic motors 8 and 9, respectively; 18, 19, 20 and 21 fluid pressure detection switches adapted to detect the fluid pressures applied to the first, second, third and fourth speed range clutches A, B, C and D, respectively, and take out signals e, f, g and h corresponding thereto; 22, 23, 24 and 25 clutch engage switches adapted to control the aforementioned first, second, third and fourth speed range clutches A, B, C and D, respectively; and 26 and 27 actuators adapted to control the amount of fluid displacement of the hydraulic pumps 6 and 7, respectively. Reference numeral 28 denotes a logic control unit which is adapted to receive the above-mentioned input signals a, b, c, d, e, f, g, h and $n_E$, $n_{m1}$ and $n_{m2}$ and send out, in response to the input signals, output signals i and j to the actuators 26 and 27 adapted to control the amount of the fluid displacement of the hydraulic pumps 6 and 7, respectively, and output signals k, l, m and n to the first, second, third and fourth clutch engage switches 22, 23, 24 and 25, respectively.

While the number of revolutions of the engine is determined by the position of the throttle means and the load torque, the load torque can be varied by the speeds ratio of the input shaft to the output shaft of the transmission 1. Since the hydro-mechanical transmission employing the control system of the present invention is a stepless transmission, the engine speed can be controlled and set as desired relative to the position of the throttle means. Further, the speed ratio varies with the change in the amount of the fluid discharged by the hydraulic pumps 6 and 7; that is, the engine speed will reduce with the increase in the speed ratio, and the engine speed will increase with the decrease in the speed ratio. Therefore, when an optimum engine speed is set relative to the position of the throttle means and the speed ratio of the transmission 1 is controlled to obtain the optimum engine speed, an optimum operation of the engine can be achieved.

Figure 2:
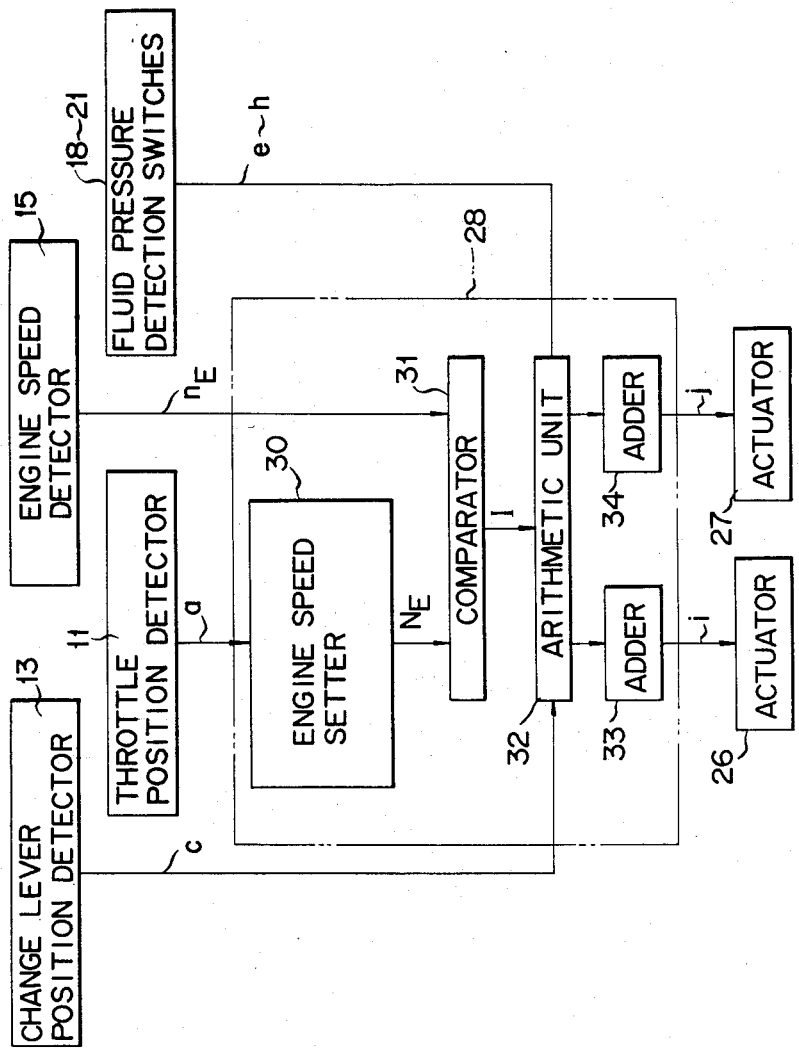
FIG. 2 is a block diagram of an engine speed control system according to the present invention.

An example of the engine speed control system according to the present invention will be described below with reference to FIG. 2.

A throttle position signal "a" corresponding to the position of the throttle means at a given moment is sent out by the throttle position detector 11 to an engine speed setter 30 as an input thereof. This engine speed setter 30 stores in its memory the relationship between the target engine speed and the position of the throttle means. When the engine speed setter 30 receives the throttle position signal "a" as its input, it will generate a signal $N_E$ corresponding to the target engine speed. This target engine speed signal $N_E$ and an engine speed signal $n_E$ from the engine speed detector 15 adapted to detect the actual engine speed are both sent to a comparator 31 which functions to compare the signals $N_E$ and $n_E$ and generate an engine speed differential signal I as its output. The engine speed differential signal I is sent to an arithmetic unit 32. Sent as inputs to the arithmetic unit 32 are a signal C generated by the change lever position detector 13 and which corresponds to any of forward run, reverse run, neutral and spin turn positions and any one of the signals e, f, g and h generated by the fluid pressure detection switches 18, 19, 20 and 21, respectively corresponding to a selected speed range of the transmission. The signals i and j whose values are set so that, as a result of operating the input signals I and C and any one of the input signals e, f, g and h, the engine speed differential signal I may approximate to and eventually become zero, will be sent out as an output from adders 33 and 34 to the actuators 26 and 27 adapted to control the amount of the fluid displacement of the hydraulic pumps 6 and 7, respectively.

The hydraulic pumps 6 and 7 are controlled by the signals i and j, respectively, to change the speed of the vehicle so as to allow the actual engine speed to converge into the target engine speed.

The above-mentioned adders 33 and 34 serve to add the engine speed differential signal $+I$ or $-I$ to the signals i, j being generated at a given moment.

According to the present invention, therefore, by setting the position of the throttle means, the vehicle speed can be automatically controlled so that the difference between the target engine speed to be set by the throttle position and the actual engine speed may become zero. Consequently, it is possible to automatically control the engine speed so as to allow it to approach and eventually become equal to the target engine speed set by the position of the throttle means.

What is claimed is:

1. An engine speed control system for a hydro-mechanical transmission of a vehicle including an engine, mechanical transmission means connected to the engine and having a plurality of speed range change-over clutches, a pair of hydraulic pumps driven by the engine, a pair of hydraulic motors each driven by the respective hydraulic pumps and operatively connected to the mechanical transmission, and a change lever for changing forward and reverse running of the vehicle, said control system comprising:
   throttle position detector means for detecting throttling position of the engine and generating a first signal therefrom;
   engine speed setter means responsive to the first signal and generating a second signal indicating a target engine speed;
   engine speed detector means for detecting actual engine speed and generating a third signal;
   comparator means for comparing the second signal with the third signal and generating a fourth signal indicating speed difference between the target and actual engine speeds;
   change lever position detector means for detecting change lever positions among neutral, forward and reverse positions and generating a fifth signal;
   means for selectively detecting one of the speed range change-over clutches engaged and generating a sixth signal;
   arithmetic unit means for processing the fourth, fifth and sixth signals and generating a seventh signal;
   a pair of actuators for controlling displacement volume of the associated hydraulic pumps; and
   a pair of adder means each connected with said arithmetic unit means and said respective actuators, each of said adder means being adapted to feed said seventh signal and send out an eighth or ninth signal to said respective actuators, said eighth and ninth signals being such signals which will gradually approximate said fourth signal to zero.

2. An engine speed control system according to claim 1 wherein said means for selectively detecting one of the speed range change-over clutches engaged comprises a plurality of fluid pressure detection switches for detecting fluid pressure of the speed range change-over clutches.

3. An engine speed control system according to claim 1 wherein said change lever position detector means is adapted to detect change lever positions among neutral, forward, reverse and spin turn positions.

* * * * *

UNITED STATES PATENT AND TRADEMARK OFFICE
CERTIFICATE OF CORRECTION

PATENT NO. : 4,497,223
DATED : February 5, 1985
INVENTOR(S) : RYOICHI MARUYAMA ET AL It is certified that error appears in the above-identified patent and that said Letters Patent is hereby corrected as shown below:

On the cover page, Item [75], change "Hideyuke" to

--- Hideyuki ---.

Signed and Sealed this

Twenty-fourth Day of September 1985

[SEAL]

Attest:

DONALD J. QUIGG

Attesting Officer

Commissioner of Patents and Trademarks—Designate